US 8,340,415 B2

(12) United States Patent
Hoppe et al.

(10) Patent No.: US 8,340,415 B2
(45) Date of Patent: *Dec. 25, 2012

(54) GENERATION OF MULTI-RESOLUTION IMAGE PYRAMIDS

(75) Inventors: Hugues Hoppe, Redmond, WA (US); Charles Han, New York, NY (US); Matt Uyttendaele, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 354 days.

This patent is subject to a terminal disclaimer.

(21) Appl. No.: 12/754,526

(22) Filed: Apr. 5, 2010

(65) Prior Publication Data
US 2011/0243438 A1    Oct. 6, 2011

(51) Int. Cl.
G06K 9/00 (2006.01)

(52) U.S. Cl. .................. 382/167; 382/162; 382/164

(58) Field of Classification Search .......... 382/164, 382/165, 167, 209, 274, 283, 162; 345/589, 345/592, 77, 629; 375/E7.04, E7.088
See application file for complete search history.

(56) References Cited

U.S. PATENT DOCUMENTS

| 5,526,446 | A | 6/1996 | Adelson et al. |
| 5,963,676 | A | 10/1999 | Wu et al. |
| 6,469,710 | B1 | 10/2002 | Shum et al. |
| 6,754,379 | B2 | 6/2004 | Xiong et al. |
| 6,954,549 | B2 * | 10/2005 | Kraft .................. 382/167 |
| 7,103,228 | B2 * | 9/2006 | Kraft et al. .............. 382/274 |
| 7,657,083 | B2 | 2/2010 | Parr et al. |
| 7,692,664 | B2 * | 4/2010 | Weiss et al. .................. 345/592 |
| 7,912,296 | B1 * | 3/2011 | Zelinka et al. ................. 382/209 |
| 2002/0114536 | A1 | 8/2002 | Xiong et al. |
| 2003/0135289 | A1 | 7/2003 | Rising |
| 2004/0234159 | A1 | 11/2004 | Wang |
| 2004/0252230 | A1 | 12/2004 | Winder |
| 2005/0281458 | A1 | 12/2005 | Adams, Jr. et al. |
| 2009/0169102 | A1 | 7/2009 | Zhang et al. |
| 2009/0175544 | A1 | 7/2009 | Syeda-Mahmood et al. |

FOREIGN PATENT DOCUMENTS

| JP | 2009278495 A | 11/2009 |
| KR | 1020080056969 A | 6/2008 |
| WO | 9953429 A1 | 10/1999 |
| WO | 2006079997 A2 | 8/2006 |
| WO | 2009055913 | 5/2009 |

OTHER PUBLICATIONS

"International Search Report", Mailed Date: Nov. 17, 2011, Application No. PCT/US2011/030049, Filed Date: Mar. 25, 2011, pp. 8.

(Continued)

*Primary Examiner* — Anh Hong Do

(57) ABSTRACT

Embodiments are described for a system and method for generating a multi-resolution image pyramid. The method can include obtaining an image captured as a coarse image of a defined subject and a fine image of the defined subject. The fine image can be downsampled to create a temporary image. A further operation is applying a structure transfer operation to the temporary image to transfer color detail from the coarse image. The structure transfer takes place while retaining structural detail from the temporary image. A blending operation can be applied between the temporary image and the fine image to construct an intermediate image for at least one intermediate level in the multi-resolution image pyramid between the fine image and the coarse image.

20 Claims, 9 Drawing Sheets

OTHER PUBLICATIONS

D.J. Fleet & A.D. Jepson, "Multiscale Image Transforms", Chapters 7, 8, and Sections 9.1-9.2 of Forsyth and Ponce, 2004.

E. Thomas Gilmore III, et al., "Improved Human Detection Using Image Fusion", Proceedings of the IEEE ICRA 2009, Workshop on People Detection and Tracking, Kobe, Japan, May 2009.

E. H. Adelson, et al., "Pyramid methods in image processing", RCA Engineer, Nov./Dec. 1984, pp. 33-41.

Cedric Allene, et al., "Seamless Image-Based Texture Atlases using Multi-band Blending".

Sudhir Porwal, et al., "Search and Render Algorithm for Three-dimensional Terrain Visualisation of Large Dataset", Defence Science Journal, vol. 52, No. 3, Jul. 2002, pp. 277-284.

Marcelo Bertalmio, et al., "Simultaneous Structure and Texture Image Inpainting", IEEE Transactions on Image Processing, vol. 12, No. 8, Aug. 2003, pp. 882-889.

Ryan Eustice, et al., "UWIT: Underwater Image Toolbox for Optical Image Processing and Mosaicking in Matlab".

* cited by examiner

GENERATION OF MULTI-RESOLUTION IMAGE PYRAMIDS

BACKGROUND

In the computer graphics and GIS (Geographic Information System) communities, the topic of stitching and fusing collections of images to form seamless maps or panoramas has been studied extensively. Such imaging techniques have been used to assemble the large datasets available on Internet services like Keyhole, TerraServer, Bing™ Maps, Google™ Maps, and Yahoo® Maps.

Multiresolution datasets often incorporate several sources of imagery at different scales. For instance, satellite images can be provided at a coarse resolution and aerial photographic images can be used at finer resolutions. Zooming within these maps may reveal jarring transitions. The data sources from which images are drawn often vary significantly in appearance due to differences in spectral response, seasonal changes, lighting and shadows, and custom image processing. Specifically, zooming in or out within a multiresolution image pyramid often results in abrupt changes in appearance (i.e. temporal "popping"). In addition, spatial discontinuities may be observed in static perspective views, as such views access several image pyramid levels simultaneously.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. While certain disadvantages of prior technologies are noted above, the claimed subject matter is not to be limited to implementations that solve any or all of the noted disadvantages of the prior technologies.

Various embodiments are described for a system and method for generating a multi-resolution image pyramid. The method can include obtaining an image captured as a coarse image of a defined subject and a fine image of the defined subject. The fine image can be downsampled to create a temporary image. A further operation is applying a structure transfer operation to the temporary image to transfer color detail from the coarse image. The structure transfer takes place while retaining structural detail from the temporary image. A blending operation can be applied between the temporary image and the fine image to construct an intermediate image for at least one intermediate level in the multi-resolution image pyramid between the fine image and the coarse image.

DETAILED DESCRIPTION

Figure 1:
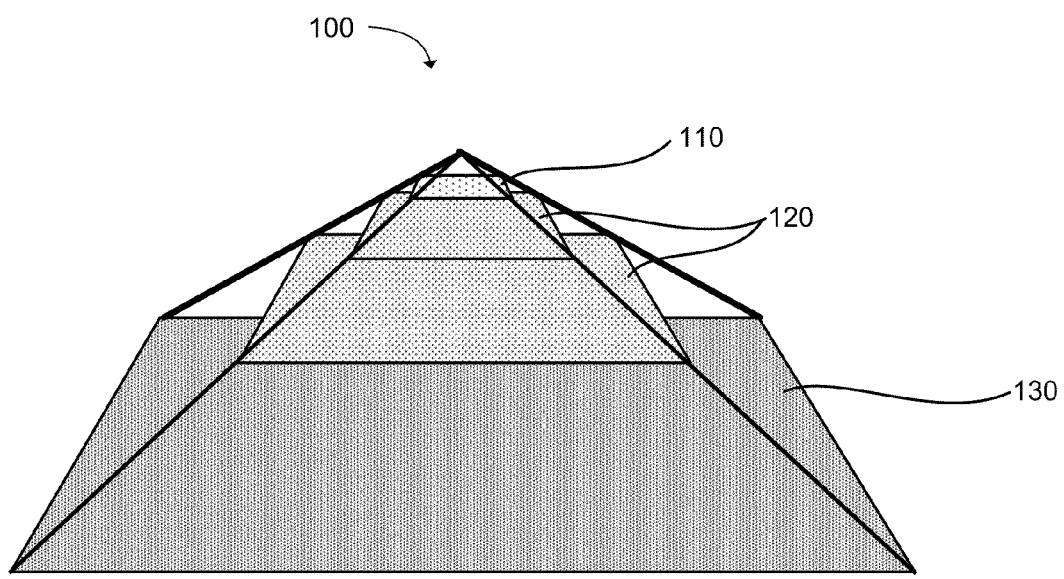
FIG. 1 illustrates an embodiment of multi-resolution image pyramid with multiple resolutions of an upsampled image.

Reference will now be made to the exemplary embodiments illustrated in the drawings, and specific language will be used herein to describe the same. It will nevertheless be understood that no limitation of the scope of the technology is thereby intended. Alterations and further modifications of the features illustrated herein, and additional applications of the embodiments as illustrated herein, which would occur to one skilled in the relevant art and having possession of this disclosure, are to be considered within the scope of the description.

A visually smooth image pyramid can be created that combines different data sources at different scales. Such image pyramids are used to transition between lower resolution images and higher resolution images in computer generated image environments. Examples of such computer generated image environments may include: simulations, games, maps, medical images, and other environments where a smooth transition is desired between a coarse resolution image and a fine resolution image.

The input imagery for the image pyramid exists at a subset of levels and the imagery may already be spatially stitched together using existing stitching techniques. While the problem of creating an image pyramid may seem simple, several straightforward approaches have drawbacks. One simplistic idea is to downsample the fine imagery all the way to the coarsest level of the pyramid, overwriting any coarser image content. Downsampling or sub-sampling is the process of reducing the sampling frequency for an image created from an original graphic image. However, fine-scale imagery is often sparsely defined, and the resulting coarser levels may have a non-uniform appearance. Instead, it is desirable to preserve the spatial consistency of the coarse-scale image.

Another possible approach is to modify the fine-scale imagery to have the same color appearance as the coarse-scale content. However, the color histogram of the fine image is often richer and the color histogram of the fine image may be preferred. In particular, the differences in appearance at the edges of images and across levels of an image pyramid can be noticeable in static perspective views. Similarly, the solution of replacing coarse pyramid levels by downsampling the sparse fine imagery may lead to a patchwork appearance at coarser levels.

In order to address these issues, the present technology can create an image pyramid 100 with multiple resolutions of an upsampled image, as illustrated in FIG. 1, from stitched imagery at several scales that provides smoother visual transitions when zooming occurs. The present technology provides techniques that improve the transitions between images. One technique called structure transfer is a nonlinear operator that combines the detail of one image with the local appearance of another image. This operation can be used to inject detail from a fine image 130 into a coarse image 110 while retaining color consistency. The improved structural similarity provided in intermediate resolution images 120 from the structure transfer operation significantly reduces inter-level ghosting artifacts. The second technique can be called clipped Laplacian blending and this blending technology can be an efficient construction to minimize blur when creating intermediate levels. Such blending considers the sum of all inter-level image differences within the pyramid.

This process can simultaneously satisfy both multi-resolution and spatial continuity. As a result, the visual differences between adjacent levels of the image pyramid can be minimized. In addition, the color characteristics of both the coarse and fine imagery can be preserved.

The visual difference between two images is often measured using the mean squared error (MSE) of corresponding pixels. While this simple point wise metric leads to convenient linear systems, it does not accurately capture the perceptual characteristics of the human visual system. Rather, a metric that emphasizes structural similarity (SSIM) can be more effective. In particular, minimizing MSE alone results in an image pyramid with severe ghosting artifacts. One problem with simply minimizing MSE is that the coarse and fine images have differences in structural detail due to misregistration, parallax, or many other unavoidable factors in image acquisition and processing. Explicitly considering structural similarity helps to overcome ghosting.

Maximizing structural similarity is generally a nonlinear problem and therefore expensive to solve directly. To attain an efficient solution, the problem can be divided into two parts. First, a structure transfer operation can be used to maximize structural compatibility. This operation can modify the coarse image to inherit the detail of the fine image while preserving its original local color characteristics.

Second, once the structurally compatible images have been created, the sum of all inter-level image differences within the pyramid can be minimized using the MSE metric. This difference function can be defined judiciously to avoid signal blurring. Although minimizing MSE is a linear problem, a global solution over all pixels in a large image pyramid is still costly. A good approximate solution can be found using an efficient construction with clipped Laplacian blending.

Figure 2:
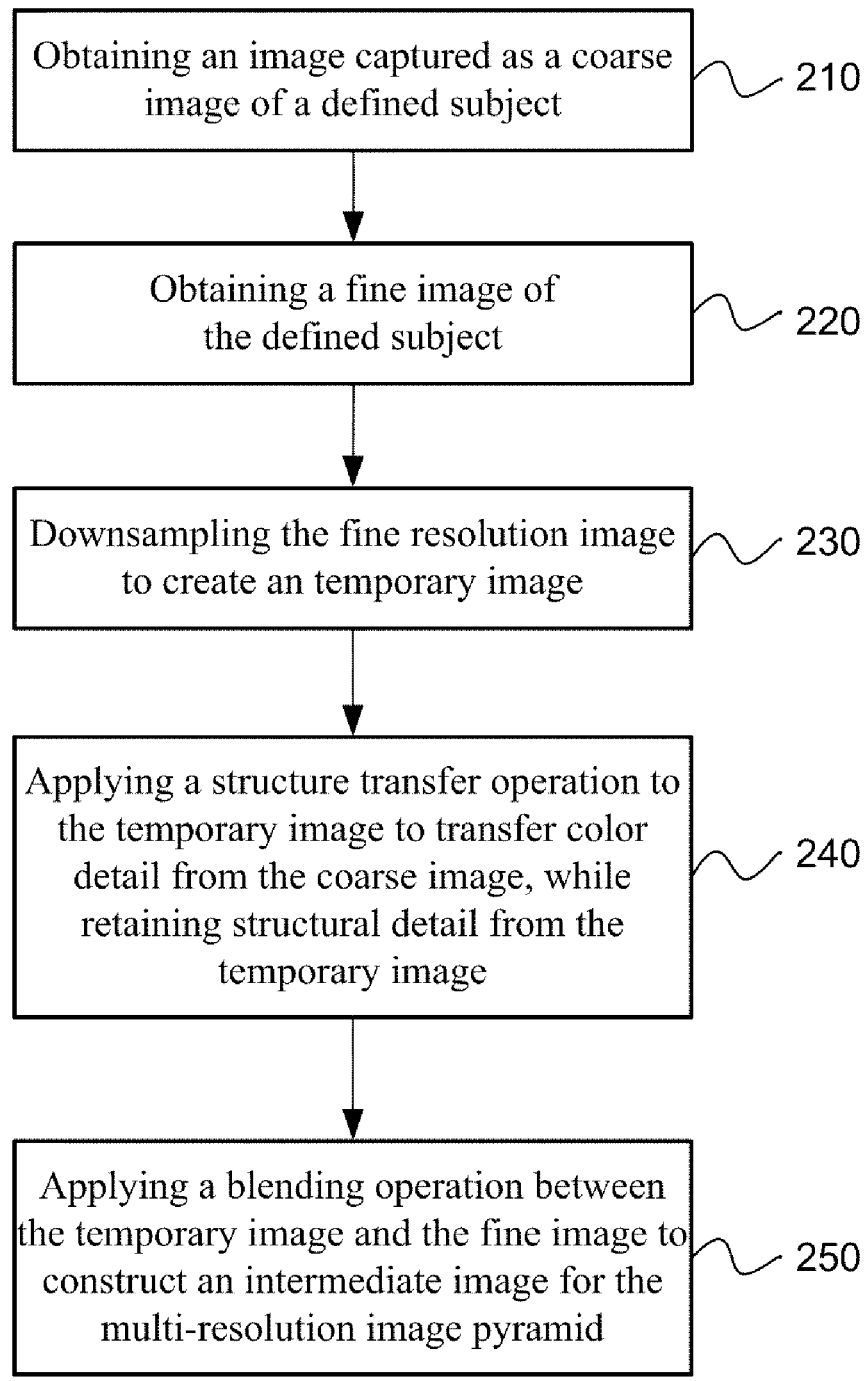
FIG. 2 is a flowchart illustrating an overview of a method for generating a multi-resolution image pyramid in an embodiment.

FIG. 2 is a flowchart illustrating a high level overview of an embodiment of a method for generating a multi-resolution image pyramid. The method can include the operation of obtaining an image captured as a coarse image of a defined subject, as in block 210. An example of a coarse image is a satellite image of certain geographic area (e.g., a Landsat image) or a coarse texture that is applied to a 3-D geometric object. An image can also be captured as a fine image of the defined subject, as in block 220. An example of a coarse image is an aerial photographic image of the same geographic area as the coarse image or a fine texture that is applied to a 3-D geometric object. The coarse image and fine image of the defined subject can be obtained from a computer readable storage medium or a computer memory.

The fine image can then be downsampled to create a temporary image, as in block 230. A structure transfer operation can then be applied to the temporary image to transfer color detail from the coarse image, while retaining structural detail from the temporary image, as in block 240.

A blending operation can be applied between the temporary image and the fine image to construct an intermediate image for at least one intermediate level in the multi-resolution image pyramid between the fine image and the coarse image, as in block 250. The operations of applying a structure transfer operation and applying a blending operation to the temporary image can be performed on a server by a computer processor.

In one embodiment, the blending operation can be clipped Laplacian blending. The Laplacian blending may include applying a blending operation that blends a Laplacian pyramid from the fine image with a Laplacian image generated from the coarse image. A fine Laplacian image pyramid can be formed that has a plurality of downsampled images from the fine image. Similarly, a coarse Laplacian image pyramid can be constructed from a plurality of downsampled images from the coarse image. A Laplacian pyramid represents a single image as a sum of detail at different resolution levels. In other words, a Laplacian pyramid is a bandpass image pyramid obtained by forming images representing the difference between successive levels of the Gaussian pyramid.

Figure 6:
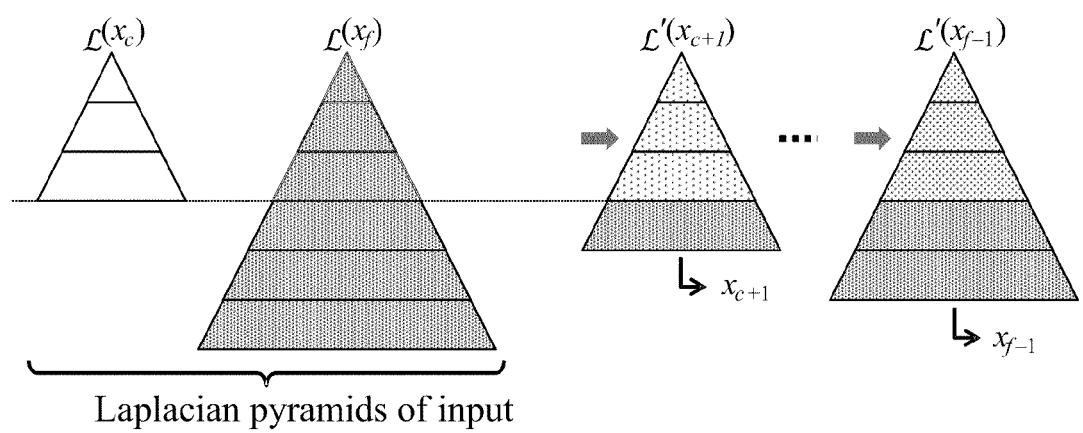
FIG. 6 is a chart illustrating an embodiment of a process used in clipped Laplacian blending.

In clipped Laplacian blending, one or more intermediate images for the multi-resolution pyramid can be generated by blending the corresponding levels of the coarse Laplacian pyramid and fine Laplacian pyramid from the root level (coarsest level) to the level of the coarse image (described in more detail later with FIG. 6). In other words, the Laplacian pyramid levels at resolutions equal to or coarser than the coarse image are blended together according to an alpha parameter $\alpha$. In addition, the Laplacian pyramid levels at resolution levels greater than the coarse image are taken only from the Laplacian pyramid of the fine image. The intermediate image can then be constructed by summing the resulting Laplacian pyramid levels. For example, $x_{(c+1)}$ is the sum of the blended Laplacian pyramid $L_{(c+1)}$. This summarized process can be repeated for the other intermediate images, and this process will be described in more detail later.

Figure 3:
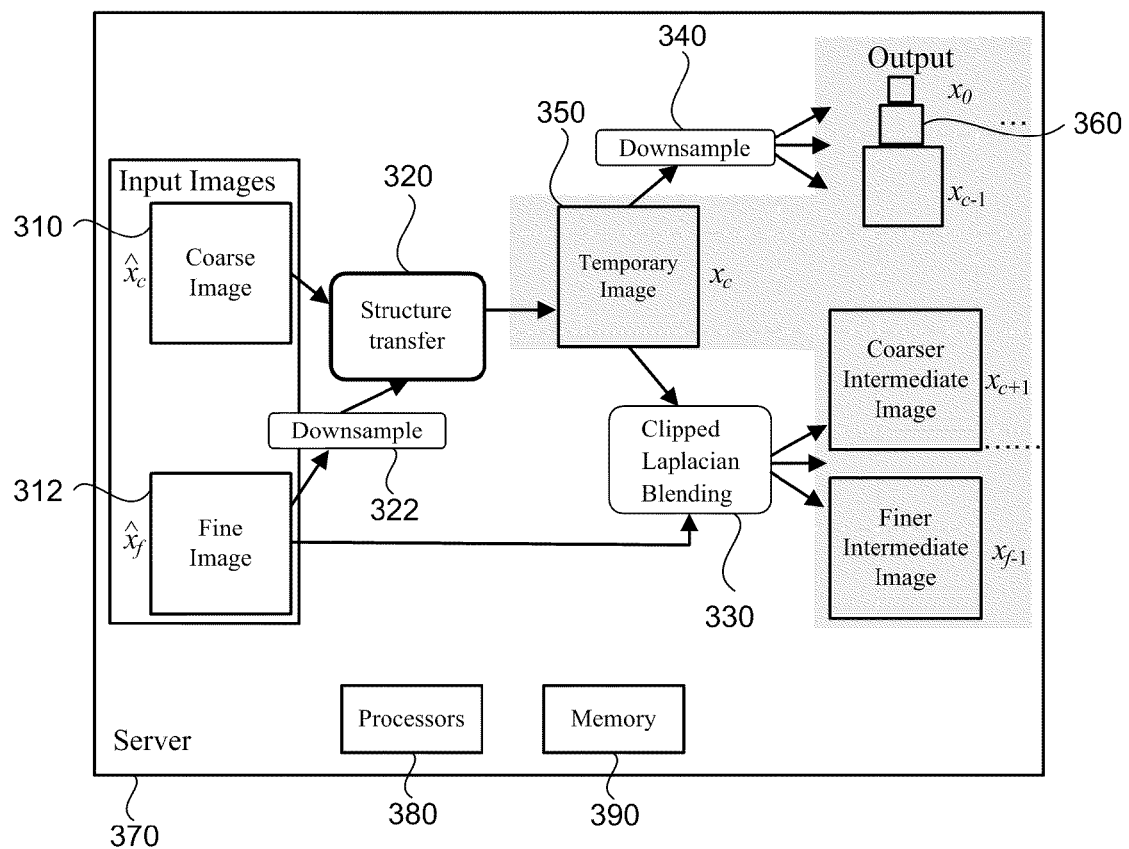
FIG. 3 is a block diagram illustrating an embodiment of a method for creating a multi-resolution image pyramid.

A block diagram of the process for creating a multi-resolution image pyramid is illustrated in FIG. 3. A coarse image 310 can be combined with the downsampled 322 version of the fine image 312 using structure transfer 320. The structure transfer operation will be described in more detail later.

Next, clipped Laplacian blending 330 creates the intermediate levels. Finally, the structure-transferred coarse image 350 (or temporary image) is downsampled 340 so that its new detail structure is propagated to even coarser levels 360.

The image pyramid construction is performed using pre-processing of the images. So any 2D or 3D client renderer need not be modified to benefit from the improved multi-resolution continuity. The pre-processing can take place on a server 370 or a computing cloud that has a plurality of processors 380 and memory 390 to service the pre-processing modules or operations described above. Alternatively, the pre-processing described may be embedded in firmware or special purpose hardware.

Image Pyramid Representation

An image pyramid can be denoted by a set $x=\{x_0, \ldots, x_f\}$ where the coarsest image $x_0$ contains a single pixel and each image $x_l$ has $2^l \times 2^l$ pixels. The most common form is a Gaussian pyramid, in which each level contains a low-pass filtered version of a given fine image $x_f$. It is denoted as $\mathcal{G}$, and is formed by successively applying a downsampling filter:

$$\mathcal{G}_f = x_f, \mathcal{G}_{l-1} = D_l \mathcal{G}_l,$$

where the rows of a sparse matrix $D_l$ encode the filter weights.

Another useful form is a Laplacian or band pass pyramid, which contains differences between successive Gaussian levels. More precisely, each Laplacian level contains the difference between the current Gaussian level and an upsampled version of the next-coarser Gaussian level:

$$L_0 = \mathcal{G}_0, L_l = \mathcal{G}_l - U_{l-1} \mathcal{G}_{l-1}.$$

To define the upsampling matrix U, an interpolatory bicubic filter may be used, which is also known as Catmull-Rom interpolation. This filter is a tensor product of two 1D filters.

Evaluated on the pyramid, each 1D filter has weights (−9 111 29 −3)/128 and (−3 29 111 −9)/128 on alternate pixels.

The downsampling filter can be selected by taking the transpose of the upsampling matrix, i.e. $D_l = U_{l-1}^T$. Consequently the 1D weights of the filter are (−3 −9 29 111 111 29 −9 −3)/256. This filter yields better results than a simple box filter with weights (1 1)/2. While an interpolatory bicubic filter has been described as an example, there are many other known filter choices for downsampling and upsampling filters.

The product of the upsampling matrices from coarser level k to finer level l can be denoted $U_k^l = U_k U_{k+1} \ldots U_{l-1}$ and similarly for the downsampling matrix $D_l^k$. The image computation can be performed in a desired color space (e.g., Lab color space or RGB (Red, Green, and Blue)).

The underlying framework for creating an image pyramid will be described, which will be followed by a more specific description of example processes and methods of implementing this technology. The inputs to the process can be coarse and fine images $\hat{x}_c$ and $\hat{x}_f$, respectively, and the output can be image pyramid levels $\{x_l\}$. The goal can be to minimize visual differences between successive pyramid levels, while preserving the color characteristics of the coarser pyramid levels. These two goals can be represented as the maximization of an objective:

$$E(x) = \sum_{l=1\ldots f-1} MSSIM(D_1 x_1, x_{l-1}) + \sum_{l=0\ldots c} Mlc(\hat{x}_l, x_l). \quad (1)$$

The first term sums the mean structural similarity (MSSIM) of all adjacent pyramid levels. The MSSIM(x, y) of two images x, y is the mean SSIM over all corresponding N×N (e.g., 11×11) pixel neighborhoods $u \subset x$, $v \subset y$. The neighborhood SSIM is defined as the product of these factors:

$$SSIM(u,v) = l(u,v) \cdot c(u,v) \cdot s(u,v).$$

The luminance similarity l, the contrast similarity c, and the structure comparison s are defined in terms of the mean colors $\mu$, standard deviations $\sigma$, and covariance $\sigma_{uv}$ of the neighborhoods:

$$l(u,v) = \frac{2\mu_u \mu_v + c_1}{\mu_u^2 + \mu_v^2 + c_1},$$

$$c(u,v) = \frac{2\sigma_u \sigma_v + c_2}{\sigma_u^2 + \sigma_v^2 + c_2},$$

$$s(u,v) = \frac{\sigma_{uv} + c_3}{\sigma_u \sigma_v + c_3}.$$

These neighborhood statistics are weighted with a spatial Gaussian kernel with a standard deviation of 2 pixels. The small constants $c_1, c_2, c_3$ exist to ensure numerical stability. The product above simplifies to:

$$SSIM(u,v) = \frac{(2\mu_u \mu_v + c_1)(2\sigma_{uv} + c_2)}{(\mu_u^2 + \mu_v^2 + c_1)(\sigma_u^2 + \sigma_v^2 + c_2)}.$$

The SSIM can be computed over each color channel independently and the mean of the channels can then be taken. The MSSIM measure reaches a maximum value of 1.0 when two images are identical.

The second term of equation (1) measures the color similarity of the original and modified coarse image levels. Specifically, the mean luminance-contrast similarity keeps only the first two factors:

$$Mlc(x,y) = \frac{1}{|x|} \sum_{u \subset x, v \subset y} l(u,v) \cdot c(u,v),$$

and thus ignores structural detail. Because the finer image $x_f$ is unaltered in this construction, it may be unnecessary to measure the finer image's color fidelity.

The process for maximizing E(x) is a nonlinear problem over a large number of variables. An approximation scheme follows a three-step approach:

Step 1: Replace $\hat{x}_c$ by $x_c$ to maximize $$\max_{x_c} Ms(x_c, D_f^c x_f) + Mlc(x_c, \hat{x}_c), \quad (2)$$

where the first term measures only structural compatibility:

$$Ms(x,y) = \frac{1}{|x|} \sum_{u \subset x, v \subset y} s(u,v).$$

This first step finds a new coarse image that is structurally similar to the downsampled fine image but whose color characteristics match those of the input coarse image $\hat{x}_c$. The structure transfer process is a fast local algorithm that approximates finding a new coarse image that is structurally similar to the downsampled fine image and the structure transfer process will be described in further detail later.

Step 2: Create the temporary image levels as $$\min_{x_{c+1} \ldots x_{f-1}} \sum_{l=c \ldots f-1} MSE(x_l, x_{l+1}). \quad (3)$$

Intuitively, the structural compatibility provided by Step 1 can construct the temporary images using the simpler (linear) MSE metric. Furthermore, clipped Laplacian blending provides a fast approximate solution to this optimization and this will be described in more detail later.

Step 3: Replace the coarser levels by downsampling $x_c$.

This downsampling makes all coarser levels structurally identical (i.e. $MSSIM(D_l x_l, x_{l-1}) = 1$ for $1 \leq c$). Because Mlc $(x_c, \hat{x}_c)$ is maximized in Step 1 and downsampling preserves luminance and contrast, $Mlc(x_l, \hat{x}_l)$ is also high for coarser levels l<c.

Structure Transfer

The coarse and fine images often come from different imaging or photographic sources, so detail structure in the two images generally does not align precisely. Consequently, any linear blending operation effectively creates a superposition of features from both images.

To address this ghosting problem, the detail from the finer image is used. This choice is motivated by the fact that imagery is typically captured at the limit of the acquisition resolution device, and may therefore have any number of defects such as chromatic aberration, sensor noise, or demosaicing error. By combining many pixels of the finer image using a high-quality downsampling, these defects can be reduced.

Therefore, the technology can find a new coarse image $x_c$ that combines (1) the structural detail of the downsampled fine image $D_f^c \hat{x}_f$ and (2) the local color distribution of the original coarse image $\hat{x}_c$. The equations $S = D_f^c \hat{x}_f$ and $C = \hat{x}_c$ refer to the structure and color images, respectively.

Figure 4:
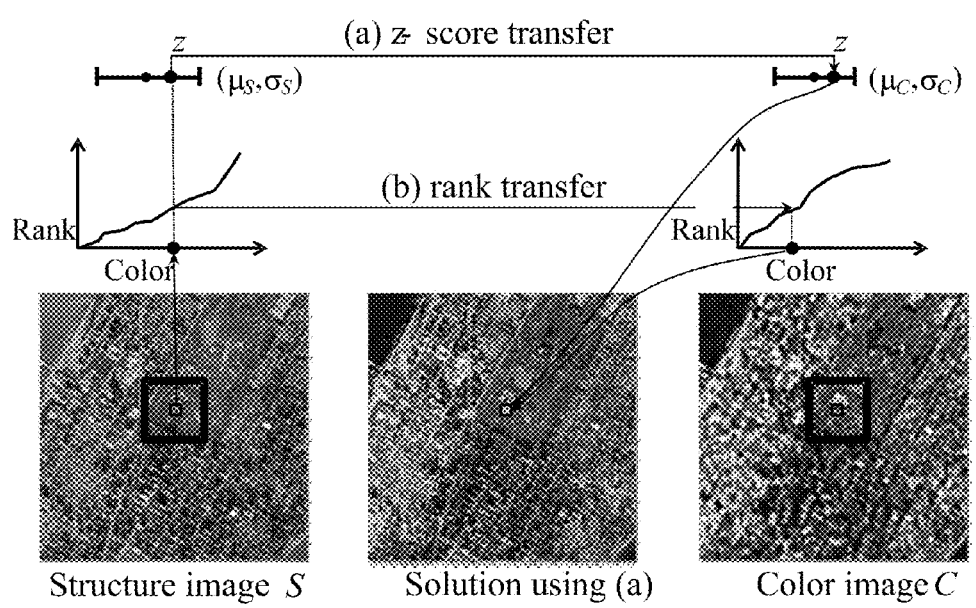
FIG. 4 is an illustration of an embodiment of the z-score and rank properties that may be used for windowing transfer calculations.

In the following discussion, each color channel of the image will be processed separately. For each color channel, a model can be built for the local distribution of colors in the neighborhood of each pixel in both images, and a property of the center pixel can be used with respect to the center pixel's neighborhood in the structure image S to select the color value with the identical property in the neighborhood in the color image C. Two properties that may be used for such calculations may be the statistical z-score and rank properties, as illustrated in FIG. 4. The computation can be performed separately for each color channel.

The Rank process will be discussed first. To transfer rank, the cumulative distribution functions (CDF) $\mathcal{C}_S$ and $\mathcal{C}_C$ can be computed for each pixel for values in the image neighborhood of S and C respectively. For each pixel, the pixel's value v is looked up in the structure image S and set the output pixel value as $v' = \mathcal{C}_T^{-1}(\mathcal{C}_S(v))$. This local rank transfer can be viewed as a windowed histogram transfer operation, which aims to precisely reproduce the color channel distributions in C. While the Rank process is useful, the process may introduce additional noise.

Another method of windowing transfer is the Z-score. Useful results can be obtained by transferring a z-score for pixel windows (i.e., approximating the local probability distribution function by a Gaussian). Mathematically, the mean $\mu_S$ and standard deviation $\sigma_S$ of the neighborhood in the structure image are computed. Next, the z-score can be determined: $z = (v - \mu_S)/\sigma_S$ where v is the color of the center pixel, and the new color can be obtained as $v' = \mu_C + z\sigma_C$ where $\mu_C$ and $\sigma_C$ are the neighborhood statistics in the color image. In both cases, the contributions of pixels in the window can be weighted using a 2D Gaussian. Useful results can be obtained in one example embodiment with a standard deviation of 5 pixels (over a window of $23^2$ pixels).

The z-score transfer approximates the maximization of equation (2), because the z-score transfer preserves the local luminance (mean value $\mu$) and contrast ($\sigma$) of the color image C while altering the detail (z-scores) to correlate with the structure image S. The z-score technique is a greedy approximation in that the technique processes each pixel independently, while ignoring how the neighboring pixel values are simultaneously modified. In other embodiments, a more integrated or less greedy transfer process can be used.

Figure 5:
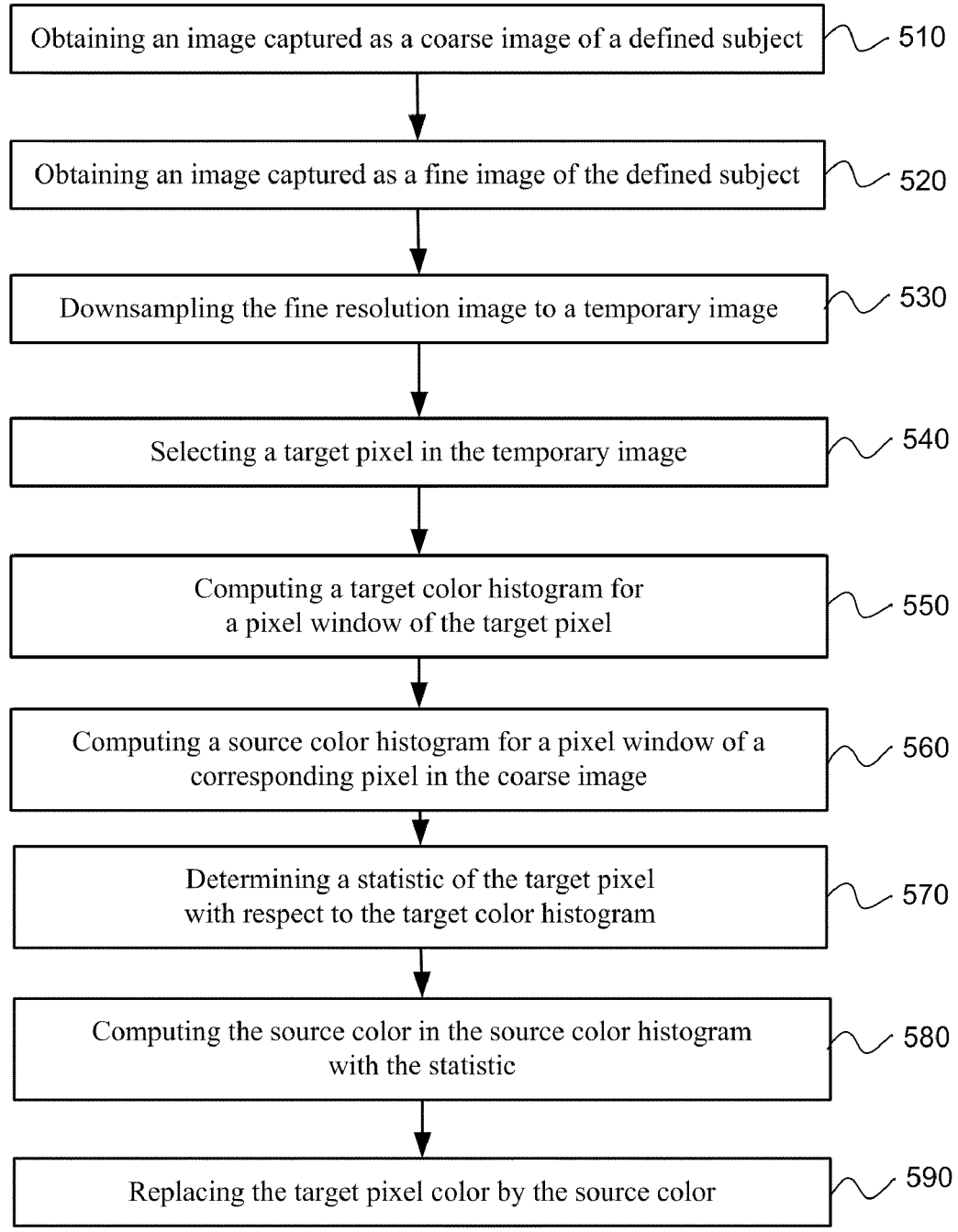
FIG. 5 is flowchart illustrating an embodiment of a method for generating an image that includes image structure detail from a fine image and color from a coarse image.

FIG. 5 illustrates an example process of the method for using the structure transfer described for generating an image that includes image structure detail from a fine image and color from a coarse image. An image can be obtained that is captured as a coarse image of a defined subject from a computer memory, as in block 510. Another image can be obtained that has been captured as a fine image of the defined subject in the coarse image from a computer memory, as in block 520. An example of the coarse image is a satellite photo and an example of the fine image is an aerial photo. The fine image can be downsampled to create a temporary image, as in block 530.

A target pixel in the temporary image can be selected, as in block 540. Next, a target color histogram for a pixel window of the target pixel can be computed on a per-channel basis, as in block 550. Similarly, the source color histogram can be determined on a per-channel basis for a pixel window of a corresponding pixel in the coarse image using a computer processor, as in block 560. The structure transfer algorithm can be performed on a "per-channel" basis for an image that has multiple color channels. The image may also be transformed into a different color space than the image's original color space to improve the results of structure transfer. For example, the input images may be in an RGB (Red, Green, Blue) color space, and then the images may be transformed into the Lab color space to improve the structure transfer. More generally, structure transfer can be performed in any color space.

A statistic of the target pixel with respect to the target color histogram can be computed, as in block 570. For example, a target pixel's rank can be identified in a cumulative distribution function for a pixel window of the temporary image. Finding the target color histogram and the source color histogram for corresponding pixel windows enables a localized windowed histogram transfer operation to occur for a plurality of target pixels in the temporary image, and allows the target pixel color to be replaced by the source color from the coarse image. The source color in the source color histogram can be computed with the statistic, as in block 580. For example, the source color can be selected using the target pixel's rank in the cumulative distribution function for the pixel window in the coarse image and that rank can be applied to the target pixel in the temporary image to select the source color applied to the target pixel. The target pixel color can then be replaced by the source color, as in block 590.

Alternatively, the source color to be applied to the target pixel can be identified by applying a color from the correlated pixel in a coarse image that has the same standard deviation in the pixel window as the target pixel in the temporary image. A color probability distribution function can be used such as a Gaussian probability distribution function. Accordingly, a z-score can be computed for a target pixel's color in a color probability distribution function for a local pixel window. Then the z-score can be applied to the color probability distribution function for the source's local pixel window of a corresponding pixel in the coarse image in order to select the source color from the coarse image that is applied to the target pixel.

Pyramid Construction

As discussed previously, to create the temporary images $\{x_l | c < l < f\}$, the pixel differences between successive levels are minimized:

$$\min_{x_{c+1} \ldots x_{f-1}} \sum_{l=c \ldots f-1} MSE(x_l, x_{l+1}), \quad (4)$$

The precise definition of the mean squared error term $MSE(x_l, x_{l+1})$ is relevant. Two definitions can be considered. The first approach corresponds to a simple form of linear interpolation and leads to undesirable blurring. The second approach, which is defined here as clipped Laplacian blending is better able to preserve image detail.

Since equation (4) defines a sparse linear system, the linear system can be solved using an iterative solver. However, by applying certain constraints on the downsampling filter D and upsampling filter U, the global minimum of equation (4) can be directly obtained using more efficient algorithms. A specific constraint is that the filters are assumed to be orthogonal and transposes of each other:

$$D_l D_l^T = \tfrac{1}{4} I \text{ and } D_l = U_{l-1}^T.$$

One low-pass filter that satisfies both constraints is the box filter, and the box filter is undesirable for image resampling due to its less desirable frequency characteristics. Fortunately, a fast construction approach as defined here incurs a very small approximation error in conjunction with higher-order filters which have better frequency response but are not strictly orthogonal and therefore do not satisfy the assumption. The assumption and/or constraint described here is used to make the analysis easier. In practice, this assumption (or constraint) does not hold true, but the error introduced due to this incorrect assumption can be shown to be small.

Simple Linear Interpolation

The inter-level MSE between the finer image and the upsampled coarser image can first be defined as:

$$MSE(x_l, x_{l+1}) = 4^{-l} \|x_l - U_l x_l\|^2. \quad (5)$$

Here the factor $4^{-l}$ accounts for the number of pixels at level l when computing the mean error. Intuitively, minimizing equation (5) seeks to make every pixel of the finer image look like a magnified version of the coarser image.

To find the images $\{x_l\}$ minimizing equations (4) using (5), the partial derivative is taken with respect to a level $x_l$ and set to zero:

$$2(4^{-(l-1)})(x_l - U_{l-1} x_{l-1}) - 2(4^{-l}) U_l^T (x_{l+1} - U_l x_l) = 0$$

$$(\tfrac{1}{4} U_l^T U_l + I) x_l = U_{l-1} x_{l-1} + \tfrac{1}{4} U_l^T x_{l+1}.$$

The definition that $U_{l-1} = 4D_l^T$ and $D_l U_{l-1} = I$ lets $U_l^T U_l$ be rewritten as $4D_{l+1} U_l = 4I$ to obtain the local constraints:

$$x_l = \tfrac{1}{2}(U_{l-1} x_{l-1} + D_{l+1} x_{l+1}). \quad (6)$$

In other words, the image at a given level should equal the average of its adjacent levels (appropriately resampled).

A direct solution to this variational problem is found by a simple linear resampling and interpolation of the original coarse and fine images:

$$x_l = (1-\alpha_l) U_c^l x_c + \alpha_l D_f^l x_f \text{ with } \alpha_l = \frac{l-c}{f-c}. \quad (7)$$

However, this solution is less desirable because the detail of the fine image is attenuated by the blurry upsampling of the coarse image.

Clipped Laplacian Blending

In the Clipped Laplacian approach, the inter-level visual difference can be defined as the MSE between the downsampled finer image and the coarser image:

$$MSE(x_l, x_{l+1}) = 4^{-l} \|D_{l+1} x_{l+1} - x_l\|^2. \quad (8)$$

This small change to the objective function fundamentally alters the result. Specifically, the downsampling constraint is less demanding. Whereas the earlier function in equation (5) sought to make all $n^2$ pixels of the finer image look like the magnified coarser image, the improved function (8) seeks to make $(n/2)^2$ weighted averages of the finer image look like the coarser image.

To find the $\{x_l\}$ minimizing equations (4) using (8), the partial derivative is taken with respect to a level $x_l$ and set to zero:

$$2(4^{-(l-1)}) D_l^T (D_l x_l - x_{l-1}) - 2(4^{-l})(D_{l+1} x_{l+1} - x_l) = 0.$$

Pre-multiplying both sides by $\tfrac{1}{2} 4^l D_l$, the result is obtained:

$$4 D_l D_l^T (D_l x_l - x_{l-1}) - D_l (D_{l+1} x_{l+1} - x_l) = 0.$$

Using the identity $D_l D_l^T = \tfrac{1}{4} I$, this is obtained:

$$(D_l x_l - x_{l-1}) - (D_{l+1}^{l-1} x_{l+1} - D_l x_l) = 0$$

$$(D_l + D_l) x_l = x_{l-1} + D_{l+1}^{l-1} x_{l+1}.$$

Thus, the local constraint is found:

$$D_l x_l = \tfrac{1}{2}(x_{l-1} + D_{l+1}^{l-1} x_{l+1}). \quad (9)$$

In other words, the downsampling of each image should be a blended combination of the next-coarser image and the twice-downsampled next-finer image.

There is an efficient construction that satisfies the local constraints (9), and therefore globally minimizes equation (8). This can be called the Laplacian Pyramid method which will be presented now in three successively more efficient computational forms.

Solution Form 1. The Gaussian pyramid $\mathcal{G}^{x_f}$ and Laplacian pyramid $L^{x_f}$ of image $x_f$ are first formed as defined previously, and $L^{x_c}$ is similarly constructed from the coarse image. To form each intermediate image $x_l$; a new Laplacian pyramid $L^{x_l}$ is created by blending the corresponding Laplacian levels of the two images from the root level (coarsest level) to the level of the coarse image:

$$\mathcal{L}_k^{x_l} = \begin{cases} (1-\alpha_l) \mathcal{L}_k^{x_c} + \alpha_l \mathcal{L}_k^{x_f} & k \le c \\ \mathcal{L}_k^{x_f} & k > c, \end{cases} \quad (10)$$

where $\alpha_l$ is defined as in equation (7). The process can be called clipped Laplacian blending as illustrated in FIG. 6. Clipped Laplacian blending creates intermediate-resolution images by smoothly transitioning the coarse levels of the Laplacian pyramids while iteratively adding intact fine detail. If the two Laplacian pyramids were blended across all levels, this would recreate the less effective solution described that uses simple linear interpolation.

Each temporary image can be reconstructed as:

$$x_l = \sum_{k=0\ldots l} U_k^l \mathcal{L}_k^{x_l} \quad (11)$$

$$= U_{l-1}(\ldots(U_0(\mathcal{L}_0^{x_l}) + \mathcal{L}_1^{x_l}) + \ldots) + \mathcal{L}_l^{x_l}. \quad (12)$$

Solution form 2. The same solution can also be obtained by linearly blending the coarse image $x_c$ with the coarse version $\mathcal{G}_c^{x_f}$ of the fine image, and adding back the Laplacian detail $L_{c+1}^{x_f} \ldots L_l^{x_f}$ of the fine image:

$$x_l = U_c^l((1-\alpha_l) x_c + \alpha_l \mathcal{G}_c^{x_f}) + \sum_{k=c+1\ldots l} U_k^l \mathcal{L}_k^{x_f}. \quad (13)$$

Solution form 3. Finally, the expression can be transformed once again to obtain an even simpler form that avoids having to compute and store Laplacian pyramids altogether. From equation (13) we obtain $$x_l = U_c^l (1-\alpha_l)(x_c - \mathcal{G}_c^{x_f}) + U_c^l \mathcal{G}_c^{x_f} + \sum_{k=c+1\ldots l} U_k^l \mathcal{L}_k^{x_f} \quad (14)$$

$$x_l = (1-\alpha_l) U_c^l d_c + \mathcal{G}_l^{x_f}, \text{ with } d_c = x_c - \mathcal{G}_c^{x_f}$$

Figure 7:
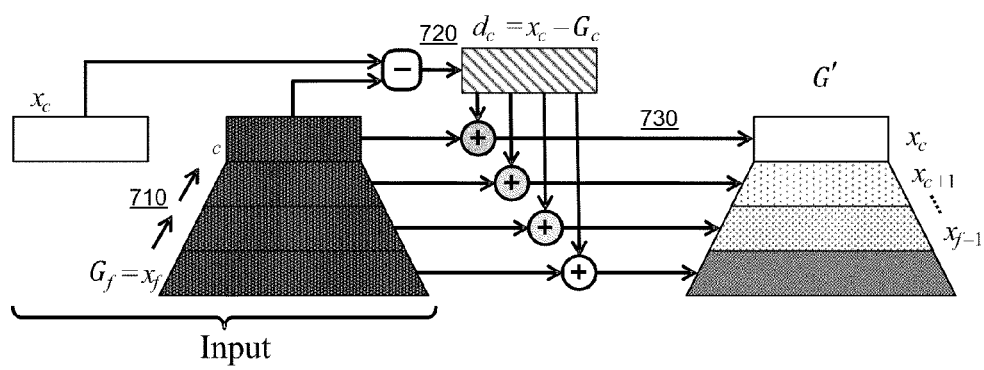
FIG. 7 illustrates an embodiment of a process for an efficient blending method for clipped Laplacian blending.

In this form as illustrated in FIG. 7, the difference $d_c$ between the coarse image and the downsampled fine image is computed, that difference is upsampled to the intermediate level, and the upsampled difference is faded into the Gaussian pyramid. FIG. 7 illustrates the process as an efficient blending algorithm with 3 steps: (1) downsampling to form Gaussian pyramid 710, (2) coarse-level differencing 720, and (3) fading the difference into the pyramid 730.

The solution of equation (14) offers a simple recurrence that lets all levels be evaluated in an efficient sequence of two passes over a pyramid structure. The results of this process are much sharper than the previous method of simple linear interpolation. A pseudo-code listing of the method is as follows:

```
(x_{c+1} ... x_{f-1}) ←ClippedLaplacianBlend(x_c, x_f) {
    G_f = x_f                  // Create the Gaussian pyramid of x_f
    for l = f - 1 ... c        // by successive fine-to-coarse
        G_l = D_{l+1}G_{l+1}   // downsampling operations.
    d = x_c - G_c              // Compute the coarse difference.
    for l = c + 1 ... f - 1    // Traverse the Gaussian pyramid,
        d = U_{l-1}d           // upsampling the difference image,
        α_l = (l - c)/(f - c)  // and adding a faded fraction
        x_l = G_l + (1 - α_l)d // of it at each level.
}
```

Figure 8:
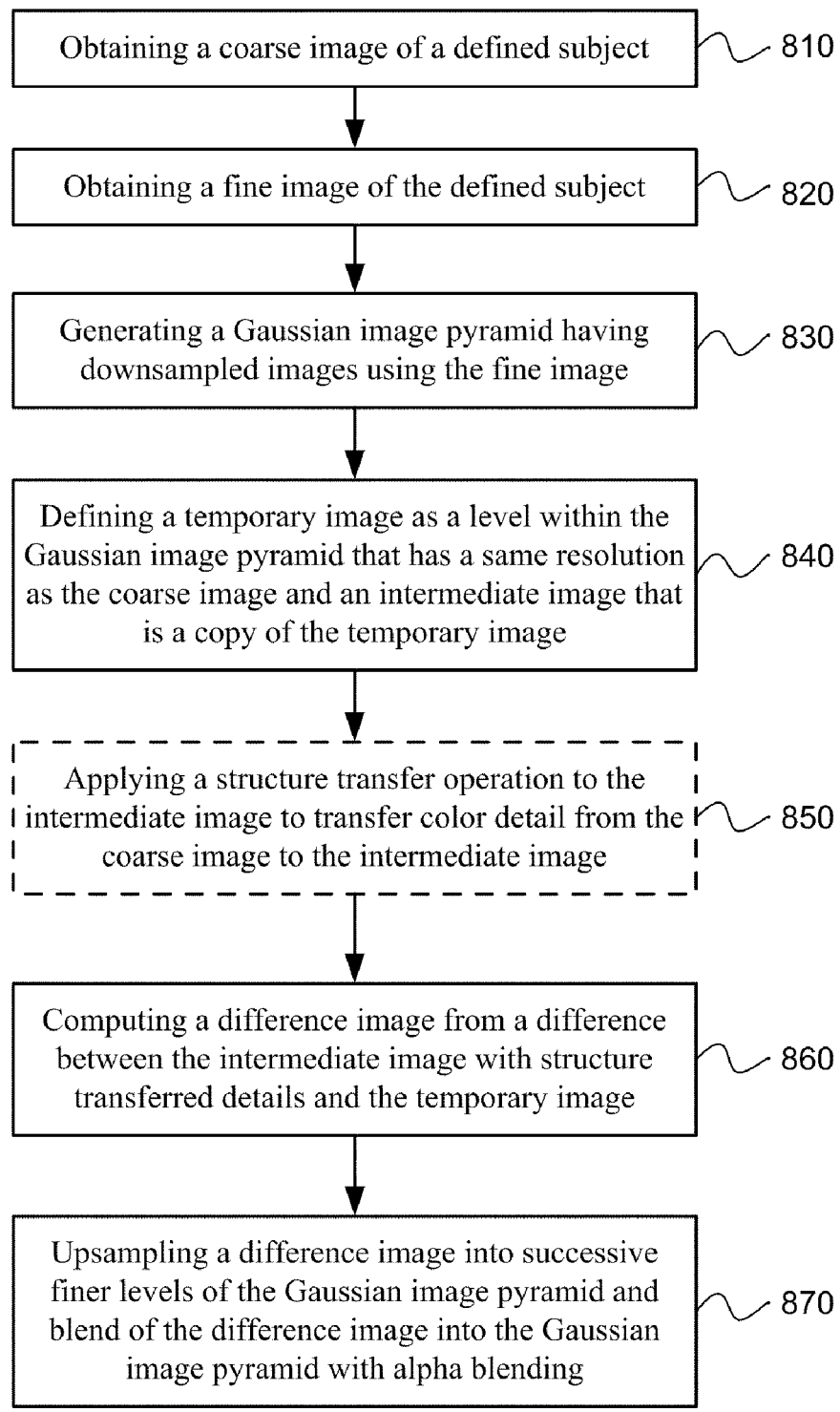
FIG. 8 is a flow chart illustrating an embodiment of efficient operations for generating a multi-resolution image pyramid used in visual transitions across multiple viewing scales.

FIG. 8 is a flowchart illustrating efficient operations for generating a multi-resolution image pyramid used in visual transitions across multiple viewing scales. A coarse image and a fine image of a defined subject can be obtained from a computer memory, as in block 810 and 820. A Gaussian image pyramid with a plurality of downsampled images can be generated using the fine image, as block 830.

A temporary image can be defined as a level within the Gaussian image pyramid that has a same resolution as the coarse image, and an intermediate image can be defined that is a copy of the temporary image, as in block 840. A structure transfer operation can then be applied to the intermediate image to transfer color detail from the coarse image to the intermediate image, as in block 850. The use of the structure transfer operation is an optional part of the process as shown by the dotted line in FIG. 8, and the clipped Laplacian blending method can be used independent from the structure transfer method.

In addition, a difference image can be generated or computed from a difference between the intermediate image with structure transferred details and the temporary image, as in block 860. A difference image can then be upsampled into successively finer levels of the Gaussian image pyramid. The difference image can be upsampled for each pyramid level and the upsampled difference image can be blended into each image at each level of the Gaussian image pyramid.

In addition, the difference image can be blended into the Gaussian image pyramid with alpha blending (i.e., linear interpolation), as in block 870. The alpha blending can be a graded amount of alpha blending, and the graded alpha blending can increase as the size of the downsampled images in the Gaussian image pyramid decreases. The graded amount of alpha blending at each level can be defined by $$1 - \frac{(l - c)}{(f - c)};$$

where l is the index value of a level of the Gaussian image pyramid being blended, f is the level index value of the fine image and c is the level index value of the coarse image.

Figure 9:
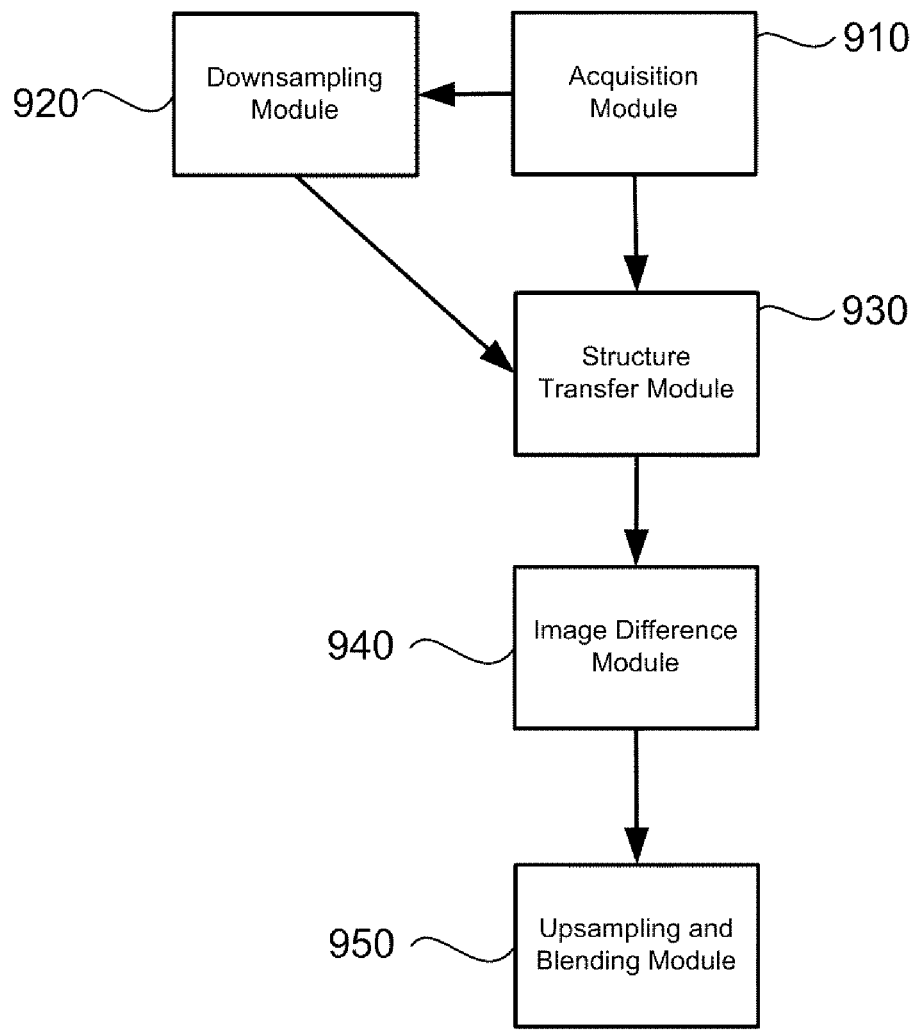
FIG. 9 is a block diagram illustrating an embodiment of modules that may be used for generating a multi-resolution image pyramid used in visual transitions across multiple viewing scales.

FIG. 9 illustrates a system for generating a multi-resolution image pyramid used in visual transitions. Each of the modules described below may be a hardware module that performs the specified processes. Alternatively, each of the modules may be a server with a plurality of processors that are networked together to perform the desired processes for the module. An example of this may be a blade server or computing farm.

An acquisition module 910 can be configured to obtain a coarse image of a defined subject. The coarse image may have a specified resolution size. The acquisition module can also obtain a fine image of the defined subject that corresponds to a view of the defined subject. As discussed before, these images may be satellite and aerial images or the images can be different levels of resolution for textures.

A downsampling module 920 can downsample the fine image to create a temporary image having the size of the coarse image. Once the downsampling has been performed, a structure transfer module 930 can apply a structure transfer operation to the temporary image to transfer color from the coarse image to the temporary image to form an intermediate image. The structure transfer can retain the structural detail from the temporary image.

An image difference module 940 can compute a difference image from a difference between the intermediate image with structure transferred details and the temporary image. An upsampling and blending module 950 can upsample the difference image into successively finer levels of the Gaussian image pyramid using blending of the difference image into the Gaussian image pyramid with a graded level of alpha blending for an image level.

While this technology has been described using orthogonal filters, the processes can also be used with non-orthogonal filters. The fast algorithms developed in the preceding sections assume the use of orthogonal up/downsampling filters. However, the cubic filters we have chosen are not strictly orthogonal and will therefore introduce some small amount of error. An error analysis for the use of non-orthogonal filters in the described technology will now be discussed. The results from the present technology can be compared against reference solutions obtained by directly minimizing equation (4) using the Gauss-Seidel iteration. Measuring the error term in equation (4) for both sets of results, the clipped Laplacian blending results typically differ by less than 1% from reference images, with the greatest difference being under 3%. Subjectively, the results are visually indistinguishable.

An example application of the present technology is geographic mapping. Because the imagery can be quite large (e.g. potentially covering the Earth), the images are typically partitioned into tiles, both for efficient processing and for fast delivery over the Internet. Fortunately, the techniques discussed (structure transfer and clipped Laplacian blending) may operate with access to just local data.

The images $G_l$, $x_l$, $d_l$ may be maintained in a few thousand tiles in correspondence with the input. Minimization of costly disk accesses is also valuable. However, in the course of processing a large image pyramid some tiles are temporarily stored to disk while new tiles are computed. To effectively manage this problem, a tile cache can be tailored to the access pattern of the described processes.

The tile access order can be known ahead of time, so an optimized caching strategy can be employed. This strategy is to evict the tile that will be needed furthest in the future. Furthermore, the tile access order can be used to pre-cache tiles in a background thread. For any given tile, the tile data dependency order is typically known. Thus, after a tile has been computed, the tile's dependencies may be examined and those tiles which are not needed to compute future tiles can be immediately evicted. Generating the finest-level tiles in Hilbert-curve order also provides effective caching performance.

An example dataset can be imagery of the Earth's surface sampled over a regular grid under a Mercator projection. In the image pyramid, the coarsest resolution (level 0) contains a single $256^2$ image tile. The finest level (level 20) conceptually contains $2^{40}$ such tiles, but is defined quite sparsely. The example input imagery may be obtained from several sources including: level 8 (4-Gpixel) may be satellite imagery, level 13 (4-Tpixel) may be "Landsat" satellite imagery, and levels 14 and above may contain sparsely defined aerial photography. Therefore, in most areas there can be two discontinuous transitions across scales: from level 8 to 9, and from level 13 to 14.

The described technology can improve both of these transitions. In this example, corrections can be made over the whole earth for level 8 to 9, and over several regions for level 13 to 14. To correct the appearance discontinuity from level 8 to 9, level 8 can be used as the coarse image $\hat{x}_c$ and level 11 as the fine image $\hat{x}_f$, and modified levels were 8 through 10. Level 8 can be replaced by the structure-transferred result $x_c$. To correct the discontinuity from level 13 to 14, levels 13 and 17 can be used as $\hat{x}_c$ and $\hat{x}_f$ respectively. In this example case, increasing the number of transition levels from 3 to 4 may be beneficial because of the greater disparity in appearance between these image sources. Modifying the detail structure does not result in objectionable spatial seams in the case where the fine-scale content is sparsely defined.

Technology has been described that can enable fast creation of smooth visual pyramids from dissimilar imagery, and practical results have been demonstrated on large datasets with a variety of content. The visually continuous image pyramid can combine different image data sources at different scales.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

Furthermore, the described features, structures, or characteristics may be combined in any suitable manner in one or more embodiments. In the preceding description, numerous specific details were provided, such as examples of various configurations to provide a thorough understanding of embodiments of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

The invention claimed is:

1. A method performed by one or more computers comprising storage and one or more processors, the method for generating a multi-resolution image pyramid, comprising:
   obtaining and storing in the storage an image captured as a coarse image of a defined subject;
   obtaining and storing in the storage another image captured as a fine image of the defined subject;
   downsampling, by the one or more processors, the fine image to create a temporary image that is stored in the storage;
   applying, by the processor, a structure transfer operation to the temporary image to transfer color detail from the coarse image, while retaining structural detail from the temporary image; and
   applying, by the one or more processors, a blending operation between the temporary image and the fine image to construct an intermediate image for at least one intermediate level in the multi-resolution image pyramid between the fine image and the coarse image, and storing the intermediate image in the storage.

2. The method as in claim 1, further comprising applying a blending operation that is clipped Laplacian blending.

3. The method as in claim 1, further comprising applying a blending operation that blends a Laplacian pyramid from the fine image with a Laplacian image generated from the temporary image.

4. The method as in claim 1, further comprising:
   forming a fine Laplacian image pyramid having a plurality of downsampled images from the fine image;
   constructing a coarse Laplacian image pyramid having a plurality of downsampled images from the coarse image;
   generating each intermediate image by forming a third Laplacian pyramid by blending the corresponding levels of the coarse Laplacian pyramid and fine Laplacian pyramid from a root level to the level of the coarse image.

5. The method as in claim 1, further comprising retrieving the coarse image and fine image of the defined subject from a computer readable storage medium.

6. The method as in claim 2, wherein the operation of applying a structure transfer operation and applying a blending operation to the temporary image are performed by a server by a computer processor.

7. A method for generating a multi-resolution image pyramid used in visual transitions across multiple viewing scales, comprising:
   obtaining a coarse image of a defined subject from a computer memory, the coarse image having a size;
   obtaining a fine image of the defined subject from a computer memory that corresponds to a view of the defined subject at a finer resolution than the coarse image;

generating a Gaussian image pyramid having a plurality of downsampled images using the fine image;
defining a temporary image as a level within the Gaussian image pyramid that has a same resolution as the coarse image and an intermediate image that is a copy of the temporary image;
computing a difference image from a difference between the intermediate image and the temporary image using a processor;
upsampling a difference image into successive finer levels of the Gaussian image pyramid and blending the difference image into the Gaussian image pyramid with alpha blending.

8. A method as in claim 7, further comprising;
applying a structure transfer operation to the intermediate image to transfer color detail from the coarse image to the intermediate image using a processor; and
computing a difference image from a difference between the intermediate image with structure transferred details and the temporary image using a processor.

9. A method as in claim 7, wherein the step of upsampling the difference image further includes blending the difference image into each image at each level of the Gaussian image pyramid.

10. A method as in claim 9, further comprising adding the upsampled difference image back into each level of Gaussian image pyramid using a graded amount of alpha blending.

11. A method as in claim 10, further comprising adding the upsampled difference image back into a selected level of the Gaussian image pyramid using a graded amount of alpha blending that increases as the size of the downsampled images in the Gaussian image pyramid decreases.

12. A method as in claim 7, further comprising adding the upsampled difference image back into each level of Gaussian image pyramid using a graded amount of alpha blending at each level defined by $$1 - \frac{(l-c)}{(f-c)};$$

where l is the index value of a level of the Gaussian image pyramid being blended, f is the level index value of the fine image and c is the level index value of the coarse image.

13. A method as in claim 7, wherein the coarse image is a satellite photo of a defined geographic area and the fine image is an aerial photo of the defined geographic area.

14. A system for generating a multi-resolution image pyramid used in visual transitions, comprising:
an acquisition module configured to obtain a coarse image of a defined subject, the coarse image having a size, and a fine image of the defined subject that corresponds to a view of the defined subject;
a downsampling module configured to downsample the fine image to create a temporary image having the size of the coarse image;
a structure transfer module configured to apply a structure transfer operation to the temporary image to transfer color from the coarse image to the temporary image, while retaining structural detail from the temporary image to form an intermediate image;
an image difference module configured to compute a difference image from a difference between the intermediate image with structure transferred details and the temporary image; and
an upsampling and blending module configured to upsample the difference image into successively finer levels of the Gaussian image pyramid using blending of the difference image into the Gaussian image pyramid with a graded level of alpha blending for an image level.

15. The system as in claim 14, wherein the structure transfer module further is configured to compute a difference image from a difference between the intermediate image with structure transferred details and the temporary image using a processor.

16. The system as in claim 14, wherein the upsampling and blending module is configured to blend the difference image into each image at each level of the Gaussian image pyramid.

17. The system as in claim 16, wherein the upsampling and blending module is configured to add the upsampled difference image back into each level of Gaussian image pyramid using a graded amount of alpha blending.

18. The system as in claim 17, wherein the upsampling and blending module is configured to add the upsampled difference image back into a selected level of the Gaussian image pyramid using a graded amount of alpha blending that increases as the size of the downsampled images in the Gaussian image pyramid decreases.

19. The system as in claim 14, wherein the upsampling and blending module is configured to add the upsampled difference image back into each level of Gaussian image pyramid using a graded amount of alpha blending at each level defined by $$1 - \frac{(l-c)}{(f-c)};$$

where l is the index value of a level of the Gaussian image pyramid being blended, f is the level index value of the fine image and c is the level index value of the coarse image.

20. The system as in claim 14, wherein the coarse image is a satellite photo of a defined geographic area and the fine image is an aerial photo of the defined geographic area.

* * * * *